United States Patent [19]

Burrous et al.

[11] Patent Number: 5,505,752

[45] Date of Patent: Apr. 9, 1996

[54] EXHAUST GAS SCRUBBER AND FILTER ASSEMBLY

[75] Inventors: Richard A. Burrous, Portland, Oreg.; Theodore E. Vanderheyden, Vancouver, Wash.; James W. Haase; Todd D. Segna, both of Portland, Oreg.

[73] Assignee: Atlas Copco Construction and Mining Technique AB, Stockholm, Sweden

[21] Appl. No.: 307,309

[22] Filed: Sep. 16, 1994

Related U.S. Application Data

[63] Continuation of Ser. No. 11,320, Jan. 29, 1993, Pat. No. 5,348,562, which is a continuation-in-part of Ser. No. 899,655, Jun. 16, 1992, abandoned.

[51] Int. Cl.⁶ ............................ B01D 46/00; B01D 47/02
[52] U.S. Cl. ............................ 55/250; 55/252; 55/257.1; 55/259; 55/356; 55/385.3; 55/385.5
[58] Field of Search ............................ 55/235, 237, 238, 55/248–256, 257.1–257.4, 259, 356, 385.1, 385.3, 385.5, 441, 459.1

[56] References Cited

U.S. PATENT DOCUMENTS

| | | | |
|---|---|---|---|
| 963,139 | 7/1910 | Griffiths | 55/441 X |
| 1,103,509 | 7/1914 | Harker | 55/259 |
| 1,267,606 | 5/1918 | Szekely | 55/441 X |
| 1,416,215 | 5/1922 | Kirkup | 55/1 |
| 1,773,073 | 8/1930 | Beach | 55/441 |
| 1,780,101 | 10/1930 | Wagner | 55/441 X |
| 1,915,987 | 6/1933 | Fisher et al. | 55/252 X |
| 1,926,841 | 9/1933 | Donaldson | 55/253 |
| 1,966,280 | 7/1934 | Bingman | 55/259 |
| 2,038,313 | 4/1936 | Placko, Jr. | 55/259 X |
| 2,252,174 | 8/1941 | Glab | 55/257.1 |
| 2,256,524 | 9/1941 | McKelvey | 55/459.1 X |
| 2,375,689 | 5/1945 | Reeder | 55/385.5 X |
| 2,648,395 | 8/1953 | Pond, Jr. | 55/257.2 |
| 2,764,142 | 9/1956 | McMullen | 55/1 |
| 2,789,032 | 4/1957 | Bagley et al. | 55/256 X |
| 3,299,620 | 1/1967 | Hollingworth | 55/126 |
| 3,334,470 | 8/1967 | Huppke | 55/90 |
| 3,348,364 | 10/1967 | Henby | 55/257 |
| 3,391,521 | 7/1968 | Pal | 55/245 |
| 3,426,513 | 2/1969 | Bauer | 55/459.1 X |
| 3,487,607 | 1/1970 | Cox | 55/222 |
| 3,552,097 | 1/1971 | Grasseler | 55/259 X |
| 3,673,769 | 7/1972 | Gleason | 55/237 X |
| 3,684,594 | 8/1972 | Schouw | 55/223 |

(List continued on next page.)

FOREIGN PATENT DOCUMENTS

| | | | |
|---|---|---|---|
| 0511415 | 11/1991 | European Pat. Off. | |
| 1582618 | 8/1973 | France | 55/441 |
| 0646684 | 9/1962 | Italy | 55/257.3 |
| 0546367 | 7/1942 | United Kingdom . | |
| 1160388 | 9/1969 | United Kingdom . | |

OTHER PUBLICATIONS

Article, "A Disposable Filter to Reduce Diesel Exhaust Particulate Emissions", *Technology News* 375 (Feb. 1991), Bureau of Mines, U.S. Dept. of the Interior, 2 pages.
Brochure, "Donaldson Disposable Diesel Exhaust Filter for Coal Mines", Bulletin #50–341, Donaldson Company, Inc., Minneapolis, Minn., 4 pages.

*Primary Examiner*—Robert Spitzer
*Attorney, Agent, or Firm*—Klarquist Sparkman Campbell Leigh & Whinston

[57] ABSTRACT

An exhaust treatment system having a water scrubber, a centrifugal water trap for removing water droplets from exhaust flow and a filter for cleaning exhaust gases. The components are housed contiguously so that exhaust piping is not needed between the components. The water trap includes a frustoconical peripheral wall and a plurality of conduits having apertures for directing exhaust obliquely against the wall. The conduit apertures face in the same rotational direction to generate a rotational circulation of exhaust within the trap, which is entirely encircled by an annular filter. The water trap and filter are housed in a portion of the housing that is a low profile flat disc shaped to extend only a limited distance above the scrubber to which it is directly attached.

16 Claims, 4 Drawing Sheets

U.S. PATENT DOCUMENTS

| | | | |
|---|---|---|---|
| 3,789,585 | 2/1974 | Arnold et al. | 55/235 X |
| 3,803,813 | 4/1974 | Yuzawa | 55/259 X |
| 3,811,251 | 5/1974 | Gibel | 55/276 |
| 3,812,657 | 5/1974 | Lampinen | 55/259 X |
| 3,853,518 | 12/1974 | Tu et al. | 55/459.1 X |
| 3,881,895 | 5/1975 | Wattles | 55/92 X |
| 3,898,064 | 8/1975 | Tao et al. | 55/276 |
| 3,957,468 | 5/1976 | Voth et al. | 55/259 |
| 3,989,485 | 11/1976 | Kilian | 55/459.1 X |
| 4,008,056 | 2/1977 | Potter | 55/85 X |
| 4,135,899 | 1/1979 | Gauer | 55/482 |
| 4,137,715 | 2/1979 | Tung-lung et al. | 55/DIG. 30 |
| 4,140,501 | 2/1979 | Ekman | 55/242 |
| 4,221,655 | 9/1980 | Nakayama et al. | 55/459.1 X |
| 4,235,609 | 11/1980 | Garigioli | 55/226 |
| 4,249,778 | 2/1981 | McGuire | 299/64 |
| 4,300,924 | 11/1981 | Coyle | 55/210 |
| 4,339,249 | 7/1982 | Berkestad et al. | 55/269 |
| 4,351,567 | 9/1982 | Gillingham | 299/45 |
| 4,374,813 | 2/1983 | Chen et al. | 55/90 X |
| 4,375,975 | 3/1983 | McNicholas | 55/1 |
| 4,375,976 | 3/1983 | Potter | 55/85 |
| 4,606,422 | 8/1986 | Jewett | 55/385.3 X |
| 4,979,968 | 12/1990 | Jido | 55/107 |
| 5,108,469 | 4/1992 | Christ | 55/90 |
| 5,129,926 | 7/1992 | Harwell | 55/255 |
| 5,201,919 | 4/1993 | Jahn et al. | 55/237 X |

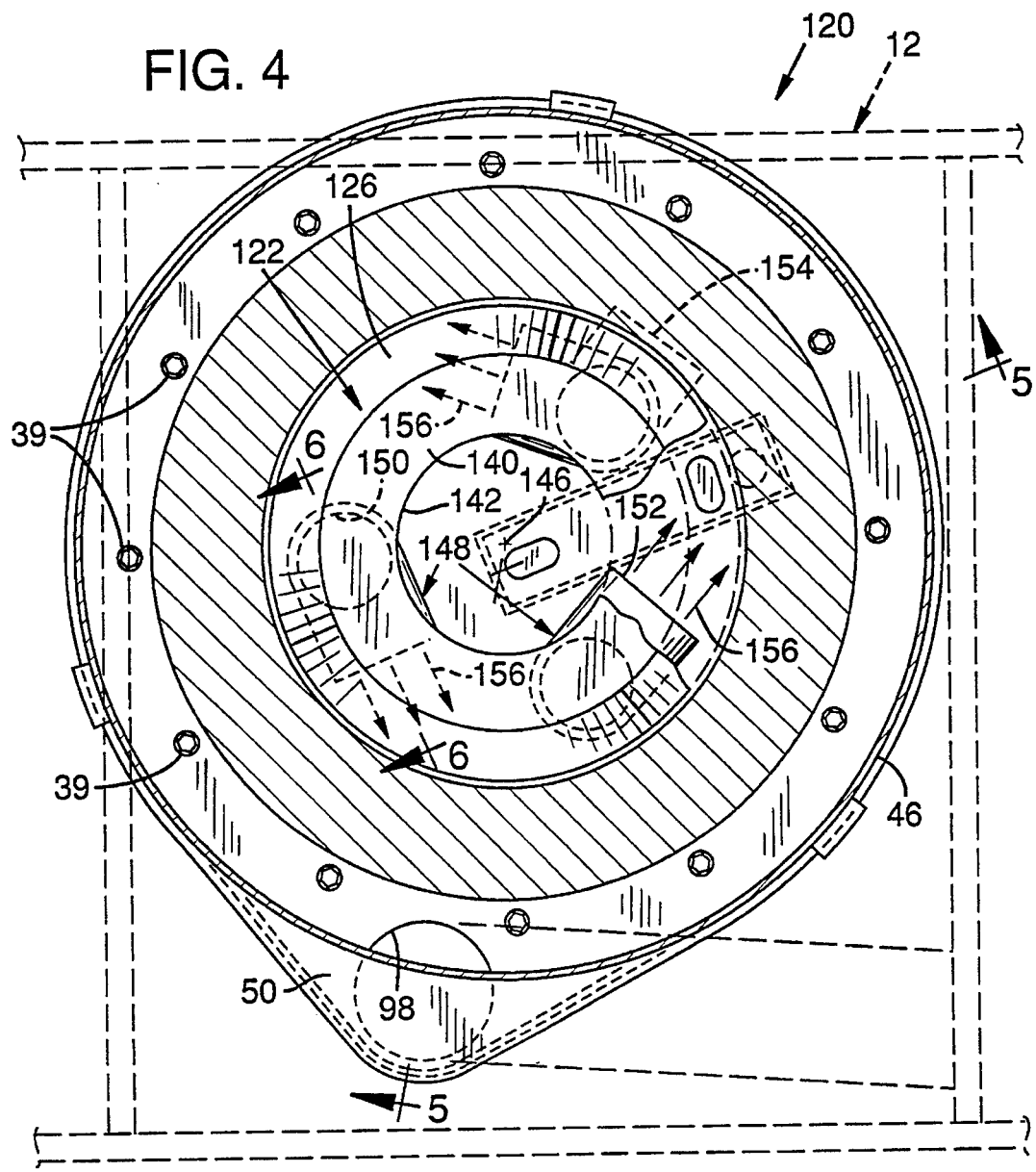
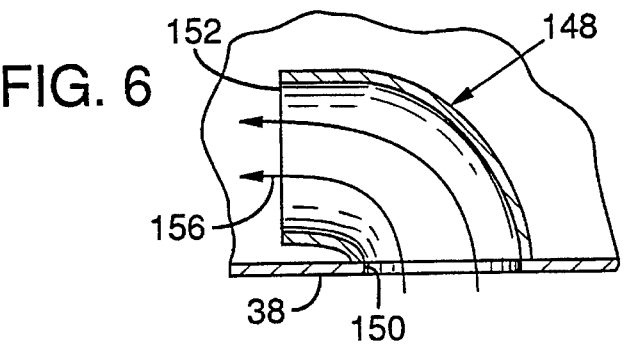

EXHAUST GAS SCRUBBER AND FILTER ASSEMBLY

CROSS REFERENCE TO RELATED APPLICATION

This is a continuation of application Ser. No. 08/011,320, filed Jan. 29, 1993, and issued as U.S. Pat. No. 5,348,562, which is a continuation-in-part of application Ser. No. 07/899,655, filed Jun. 16, 1992, now abandoned.

TECHNICAL FIELD

This invention relates to exhaust treatment systems for internal combustion engines, and more particularly to such systems incorporating water scrubbers and particulate filters.

BACKGROUND OF THE ART

Reducing the pollutants and high temperatures of internal combustion engine exhaust gases and the temperatures of hot surfaces in underground mining vehicles is essential to the safety of mine personnel in underground coal mines. Diesel engines exhaust hot sulphurous gases, aldehydes, nitrogen oxide, unburned hydrocarbons and particulate pollutants. Hot exhaust emissions, typically 800°–1000° F., and hot engine surfaces can ignite combustible gases and material present in underground mines, such as methane and coal dust.

Water jacketing the engine's exhaust manifold and piping in conjunction with the engine's cooling system reduces engine surface temperature sufficiently to meet safety requirements. However, the safety hazard and pollution problems caused by hot exhaust emissions require water scrubbers. Scrubbers either aspirate water into the stream of hot exhaust gases or bubble exhaust gases through a water bath to cool them, as shown in U.S. Pat. No. 4,300,924 to Coyle, the disclosure of which is incorporated herein by reference. Because these scrubbers introduce water droplets into the exhaust stream, a water trap is required between the scrubber and a downstream filter element to prevent water from entering the filter. Water traps typically employ a series of interleaved plates to create a labyrinthine path for exhaust gases. Droplets incident on the plates adhere to the plates and are drained away. Without such a water trap, the filter elements become blocked, degraded and damaged as they become wetted by water droplets in the exhaust stream.

Current exhaust treatment systems use separate water scrubbers, water traps, and exhaust filters in series interconnected by exhaust tubing. Such an elongated serially connected system has several disadvantages. If the system is vertically oriented, it is unsuitable for use in most underground mining operations where vertical height is at a premium. The necessary horizontal orientation generally requires substantial lengths of tubing between the components to span between the engine location and a suitable exhaust outlet location, typically at the rear of the vehicle.

Exhaust tubing must be stainless steel to avoid corrosion. Consequently the material cost to construct such an elongated system can be substantial. A serially connected system of discrete components is generally cumbersome to construct and install as well.

In addition, the substantial tubing length creates an efficiency-impairing exhaust back pressure that wastes fuel and decreases vehicle performance.

A further disadvantage of serial systems interconnected by substantially horizontal tubing lengths is that, even with an effective water trap, gaseous water vapor is more likely to condense as it travels further from the source. If there is a sufficient temperature gradient between the scrubber and the filter, condensation may occur in the cooler tubing near the filter. Such condensation may drain into the filter, causing damage, impairing filter function and requiring its premature replacement.

Because of the foregoing problems associated with existing water scrubber and water trap-filter systems, there is a need for an effective system, especially for underground mining vehicles, that overcomes such problems. This, therefore, is the primary objective of the present invention.

SUMMARY OF THE INVENTION

Other important objects of the invention are to provide:

A scrubber and filter system as aforesaid in which the system is contained within a compact package that does not protrude above a limited height.

A system as aforesaid which is integrated into a single unit to limit the amount of exhaust tubing required.

A system as aforesaid which is simple to construct and install.

A system as aforesaid which creates a limited exhaust back pressure.

A system as aforesaid which has a limited temperature differential through the system so that water reaching the filter remains in a gaseous form.

According to the illustrated embodiments of the present invention, the primary objects are achieved by providing a unitary system having a scrubber, a water trap and a filter. The system includes a conventional cylindrical scrubber in a cylindrical housing, with a disc-shaped upper housing for a water trap and filter attached directly above the scrubber housing. The upper housing includes a central exhaust inlet and includes an annular water trap surrounding the inlet. In one embodiment the water trap comprises a series of annular plates concentrically arranged. The annular plates are alternately attached to the top and bottom plates of the housing to create a labyrinthine radially outward path for the exhaust gases. Drain tubes permit collected water to flow from the water trap. In another embodiment, a centrifugal-type water trap is provided. In both embodiments, an annular air filter for radial transmission of exhaust gases is placed within the housing to circle the water trap. An exhaust gas outlet exits the housing at its periphery.

BRIEF DESCRIPTION OF THE DRAWINGS

FIG. 4 is a cross-sectional top view of an alternative embodiment of the present invention.

FIG. 6 is a sectional side view of an inlet conduit taken along line 6—6 of FIG. 4.

DETAILED DESCRIPTION OF A PREFERRED EMBODIMENT

Figure 1:
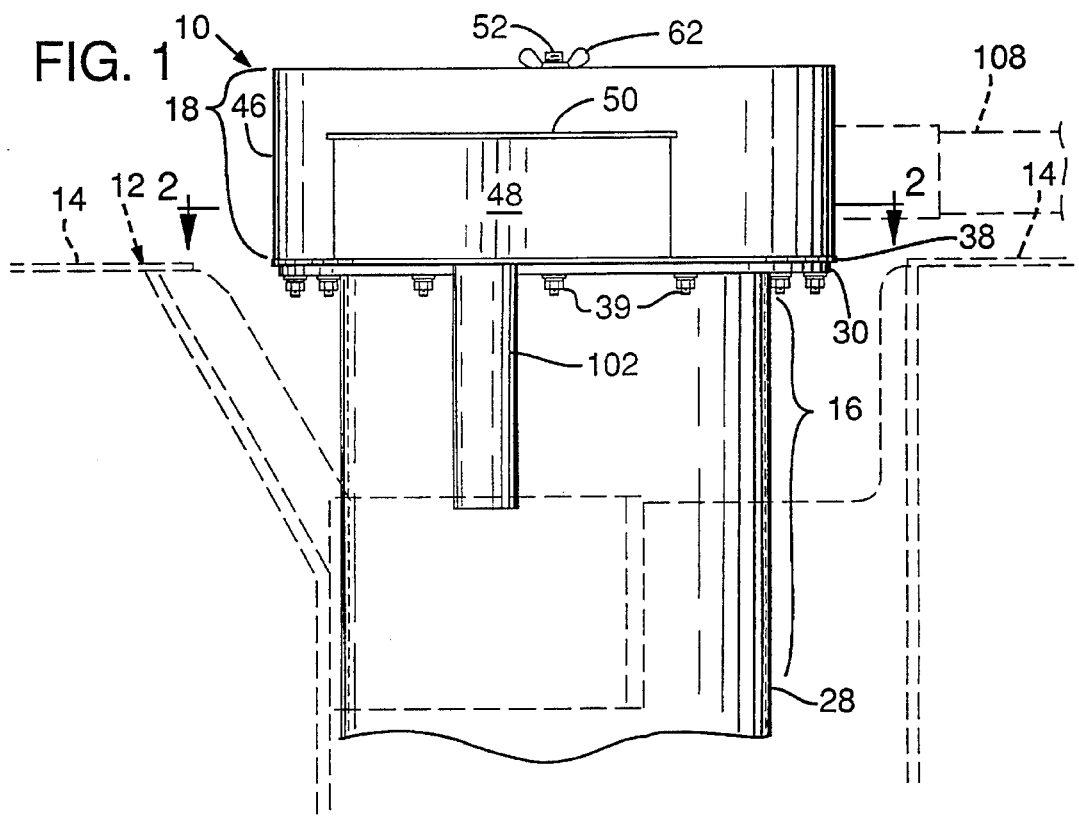
FIG. 1 is a side view of an embodiment of the present invention.
Figure 2:
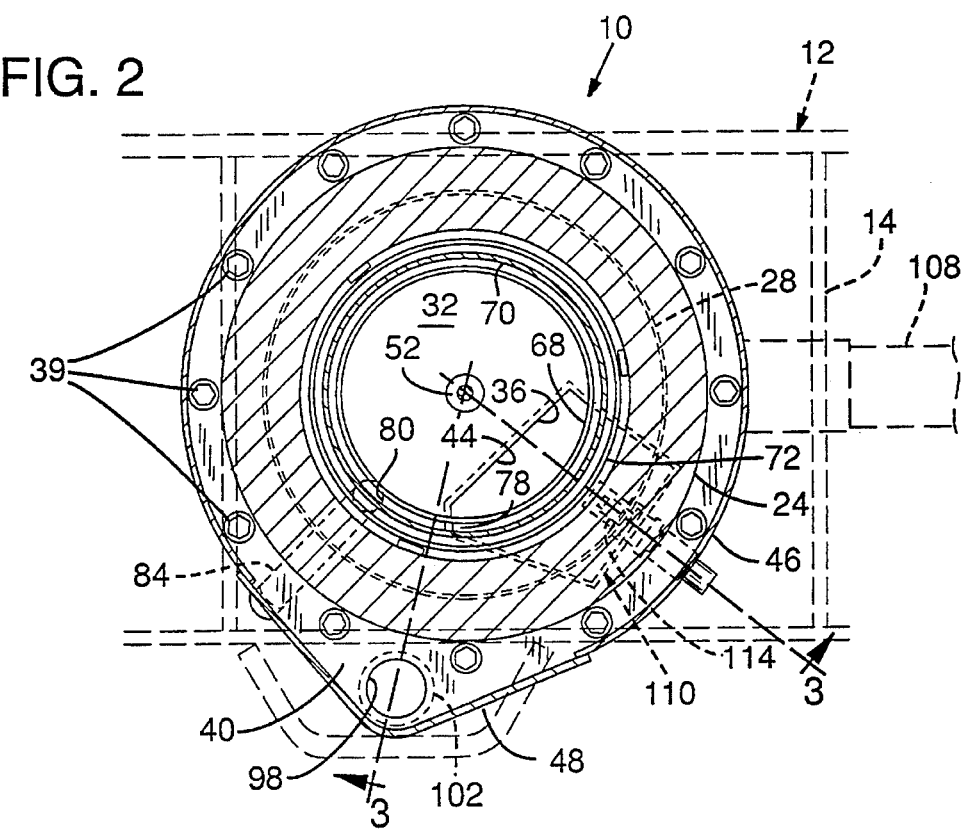
FIG. 2 is a cross-sectional view taken along the line 2—2 of FIG. 1.
Figure 3:
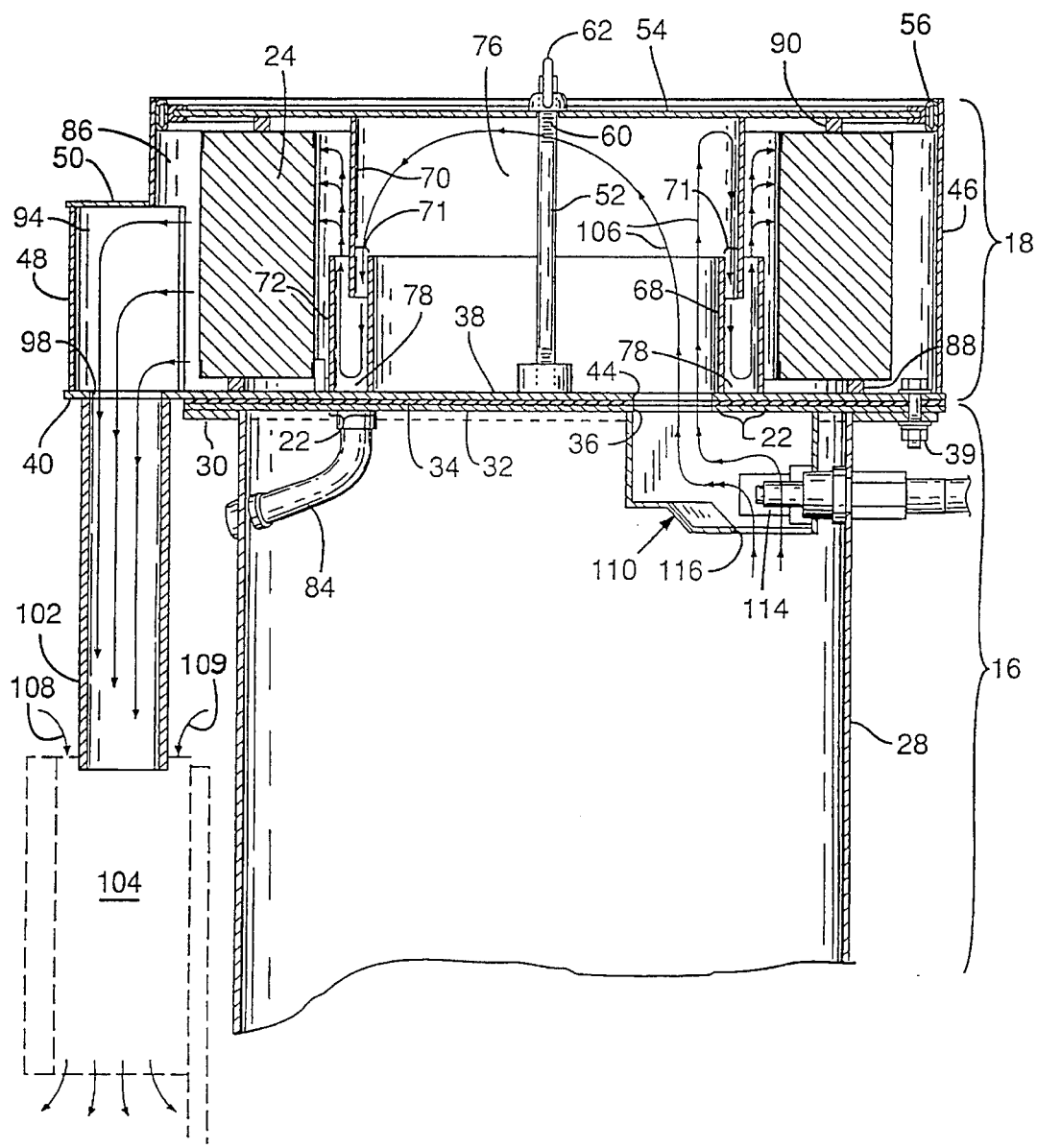
FIG. 3 is an enlarged vertical sectional view of the embodiment of FIG. 1 taken along the line 3—3 of FIG. 2.

As shown in FIG. 1, an exhaust treatment system 10 is attached to the body 12 of a mining vehicle having an upper surface 14. The exhaust treatment system 10 has a lower portion 16 including a water scrubber 28, and an upper portion 18 including a water trap 22 and air filter 24, as shown in FIG. 3. The lower portion 16 is a vertical cylinder, and the upper portion 18 is a squat, vertical cylinder coaxially aligned with the lower portion (as shown in FIG. 2) and attached directly above the lower housing portion. The lower scrubber portion 16 does not extend above the vehicle body upper surface 14. Thus, the entire system 10 protrudes above the body surface by an amount limited to the height of the low profile upper portion 18.

As best shown in FIG. 3, the scrubber 28 has a horizontal flange 30 attached at its upper end and extending outwardly therefrom. A horizontal, generally circular top plate 32 is coextensive with the flange 30 and attached thereto to cover the upper end of the scrubber 28. The top plate 32 is open near its center to define a D-shaped scrubber outlet aperture 36 offset a limited distance from the center of the scrubber top plate 32 as shown in FIG. 2. A rubber gasket sheet 34 is coextensive with and rests upon the top plate, and defines apertures to correspond to those in the top plate.

The upper portion 18 includes a horizontal base plate 38 on top of and connected face-to-face with the scrubber top plate 32, with the gasket 34 sandwiched therebetween by bolts 39 connecting the periphery of both plates to flange 30. Top plate 32 and base plate 38 effectively form a common shared wall between the lower housing 16 and the upper housing 18. The base plate 38 is generally circular, and is generally coextensive with the scrubber top plate 32, except for a protruding peripheral lobe 40 extending beyond the scrubber top plate 32 at one side. The base plate 38 further defines a water trap inlet 44 shaped and sized like the scrubber outlet aperture 36 and registered therewith. An upper cylindrical wall 46 is attached at the periphery of the base plate 38 and rises upwardly therefrom to a limited height defining the overall height of the upper housing 18. An outlet chamber wall 48 rises vertically from the periphery of the base plate at the base plate lobe 40 to a height somewhat less than the height of the upper cylinder wall 46, with an upper plate 50 horizontally spanning between the upper edge of the chamber wall 48 and the cylindrical wall 46.

A threaded spindle 52 is attached to the center of the base plate 38 and protrudes upwardly therefrom to a height slightly above the upper edge of the upper cylindrical wall 46. A flat, circular removable lid 54 has a peripheral gasket 56 and is sized to be sealably received within the upper cylindrical wall 46 just below the upper edge thereof and well above the level of the outlet upper plate 50. The lid 54 defines a central aperture 60 sized to closely receive the spindle 52. A wing nut 62 threadably engages the spindle 52 after the lid has been installed to prevent removal of the lid and leakage through the central aperture 60.

As further shown in FIG. 3, the annular water trap 22 is formed within the upper housing portion 18 and includes a series of vertical annular walls concentrically arranged within the air filter 24. A first innermost trap wall 68 is concentric with the spindle 52 and attached to the base plate 38 to extend vertically upward therefrom to a height of approximately one-third that of the upper cylindrical wall 46. The first trap wall 68 has a diameter sufficient to entirely encompass the trap outlet 44. A second intermediate trap wall 70 is externally concentric with the first trap wall 68, and depends downwardly from the removable lid 54 by a distance more than half the height of the upper cylindrical wall 46. Therefore, there is appreciable overlap between the first trap wall 68 and the second trap wall 70. The diameter of the second trap wall 70 exceeds that of the first wall 68 by a sufficient amount to define a trap gap 71 having a limited width where the walls overlap.

A third trap wall 72 projects upward from the base plate 38 and has a diameter slightly greater than the second trap wall 70 so that the third wall 72 is positioned concentrically outside thereof and overlapping therewith.

A central chamber 76 is defined in the upper housing 18 within the trap walls, above the base plate 38, and below the lid 54. An annular water collection channel 78 is defined between the first trap wall 68 and third trap wall 72, and above the base plate 38. The base plate 38 defines a drain hole 80, as shown in FIG. 2, within the channel 78. The drain hole communicates with a drain tube 84, which extends downwardly through lower scrubber housing portion 16 and outwardly from the system. The drain tube has a substantial diameter of ⅞ inch to facilitate cleaning, but has a removable narrow aperture outlet (not shown) to minimize the emission of unfiltered exhaust.

As shown in FIG. 3, an annular chamber 86 is formed within the upper housing portion 18 externally of the water trap 22. The annular filter 24 fits within this chamber 86. The filter 24 has a lower annular gasket 88 sealed against the base plate 38 and an upper annular gasket 90 sealed against the lid 54. Consequently, exhaust gas entering chamber 86 from the water trap must pass radially outward through the chamber 86 entirely through filter element 24.

An outlet chamber 94 is defined at one side of the filter by the peripheral lobe of the base plate 38, the outlet chamber wall 48 and upper plate 50. The base plate lobe 40 defines a circular outlet hole 98 that communicates with a downwardly depending outlet tube 102. The outlet tube 102 opens into a mixing chamber 104 attached to the vehicle for diluting the emitted exhaust gas with ambient air. An optional horizontal outlet 108 in communication with the annular chamber 86 may be provided if the vehicle configuration dictates.

As shown in FIGS. 2 and 3, a scrubber exhaust gas temperature sensor chamber 110 is attached to the underside of the scrubber top plate 32 and encompasses the scrubber outlet aperture. The chamber contains a temperature sensor 114 provided by a heat sensing hydraulic valve operably connected to a vehicle engine shutdown system (not shown). The chamber 110 defines a lower aperture 116, through which all exhaust gas flows. The exhaust gas subsequently passes over the sensor 114, and through aperture 36 into the upper portion 18. When the scrubbed exhaust gas exceeds a predetermined temperature, preferably no more than about 180° F., the sensor causes engine shutdown to prevent overheating and burning of the filter 24.

OPERATION

The scrubber contained within the lower housing portion 16 operates conventionally to cool the engine exhaust with water and remove some particulates therefrom. The treated exhaust gases pass upwardly through the scrubber outlet aperture 36 and water trap inlet 44 to enter the central chamber 76 of the upper housing portion 18, as shown by flow path arrows 106. The exhaust gases, which contain suspended water droplets, may exit the central chamber 76 only by passing through the water trap.

To pass through the trap, the gases first flow down through the gap 71 between the first trap wall 68 and second trap wall 70. As the gases flow through the gap 71, the flow velocity necessarily increases, accelerating the suspended droplets. The gases then exit the gap downwardly into the water collection channel 78, which is more than twice as wide as the gap between the first and second trap walls. Accordingly, the velocity of the gas diminishes, while the suspended water droplets tend to retain their momentum until they impact within the channel. When a droplet contacts any surface of the three vertical trap walls, it generally adheres and drains downward into the water collection channel 78.

The gases abruptly reverse direction, proceeding upward between the second trap wall 70 and third trap wall 72 with essentially all of the suspended water droplets having been collected in the channel 78. The exhaust gases are then forced radially outward by the sealed upper end of chamber 86, through the filter 24 into the peripheral region between the filter and the upper cylindrical wall 46, wherefrom the gases are exhausted through the outlet chamber 94 and outlet tube 102. The venturi effect of gases exiting the outlet tube 102 draws a stream of fresh air 109 downward into the mixing chamber 104 to dilute and cool the exhaust gases.

The apparatus may be opened for cleaning and filter replacement by unscrewing the wing nut 62 and removing the lid 54 to provide access.

EXAMPLE

In the preferred embodiment, the system employs an exhaust gas scrubber such as shown in U.S. Pat. No. 4,300,924 to Coyle, with the scrubber being modified so that the outlet emits exhaust through the horizontal upper plate. Accordingly, the water trap and filter portion may be retrofit onto an existing scrubber. The upper housing 18 has a diameter of about 25 inches and rises to a height of about 10½ inches above the scrubber upper surface. The water trap 22 is arranged so that the narrowest gap 71 between adjacent concentric trap walls is about ⅜ inch, and so that the walls vertically overlap by about 1 inch. The filter is preferably a paper type, model number P530-0270, available from Donaldson, Inc., of Minneapolis, Minn. Due to the corrosive nature of the exhaust gases and fluids, stainless steel is the preferred material throughout the system.

ALTERNATIVE PREFERRED EMBODIMENT

FIG. 4 illustrates an alternative exhaust treatment apparatus 120 that has a similar function and structure to the apparatus 10 of FIG. 1, except that it includes an alternative centrifugal water trap 122. This has been found in practice to be an improvement over the first embodiment, because the exhaust system back pressure is reduced.

The water trap 122 includes a frustoconical sidewall 126 that is sealably attached at a lower edge 128 to the upper surface of the base plate 38. The sidewall 126 is tapered to be downwardly open so that its lower edge 128 has a larger diameter than its upper edge 130. Consequently, the sidewall 126 has an interior surface 134 that faces inwardly and downwardly, and an exterior surface 136 that faces outwardly and upwardly. In the illustrated embodiment, the interior surface 134 is smooth and has a circular cross sectional profile to facilitate circulation within the chamber. However, a non-circular profile may be employed as an alternative embodiment, and the interior surface 134 may include ridges or other protrusions (not shown) to capture water droplets in the circulating flow.

An annular dam plate 140 is sealably attached at its periphery to the upper edge 130 of the sidewall 126. The dam plate 140 defines a circular central exit aperture 142. Together, the base plate 38, sidewall 126, and dam plate 140 define a water trap chamber 144 that is oriented on a vertical axis 146 coincident with the major axes of the scrubber 28 and upper cylindrical wall 46.

Figure 5:
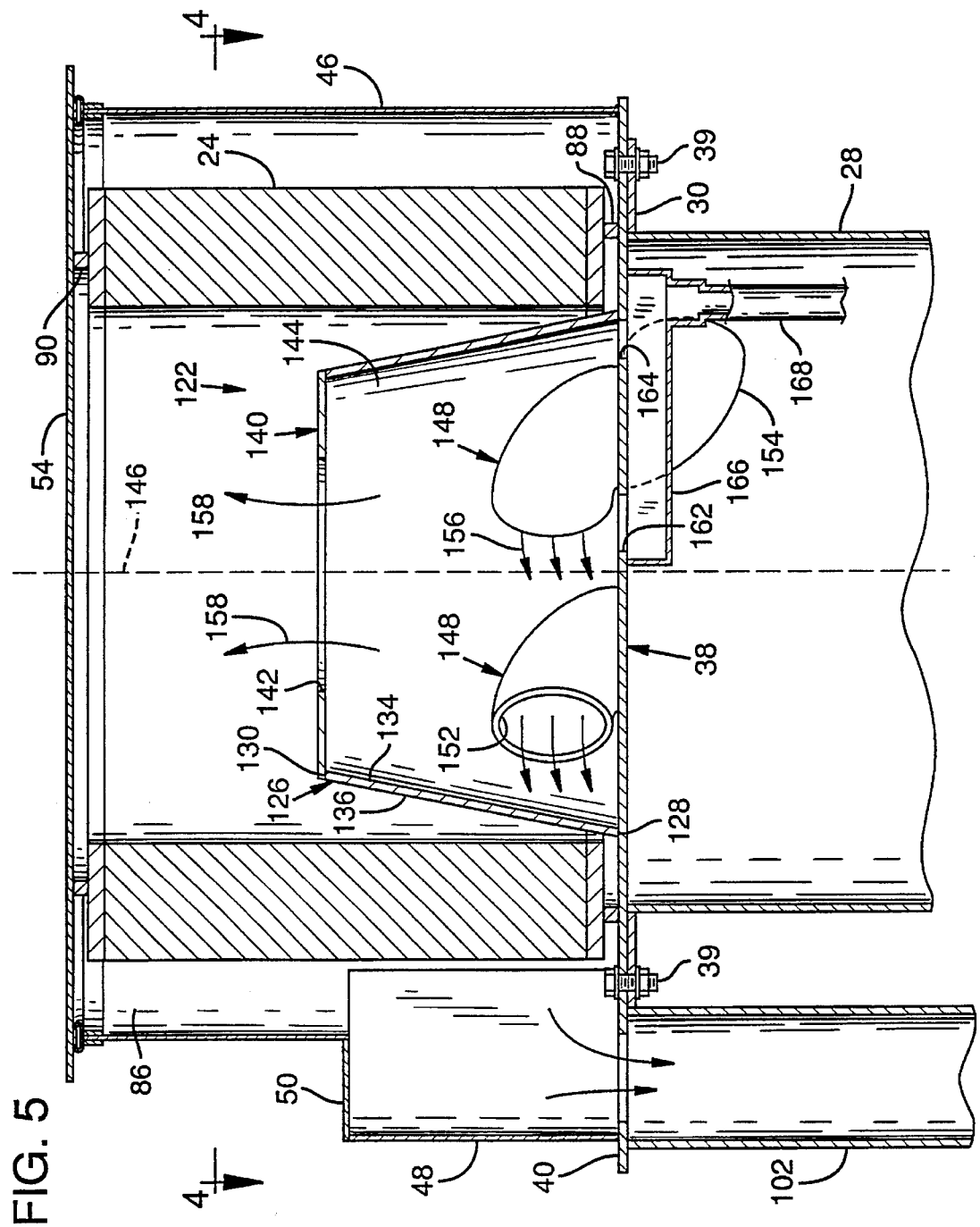
FIG. 5 is a cross-sectional view taken along line 5—5 of FIG. 4.

As shown in FIG. 5, three elbow-shaped, right angle inlet conduits 148 are attached to the base plate 38 in registration with corresponding base plate apertures 150 (shown in FIG. 6) to provide means for 1) venting exhaust from the scrubber chamber 28 to the water trap chamber 144, 2) directing exhaust obliquely against the interior surface 134 of the water trap sidewall 12, and 3) circulating gas within the chamber by generating a vortex of gas rotating or orbiting about axis 146. Each inlet conduit 148 has an exit aperture 152 that is circular and oriented in a vertical plane.

As shown in FIG. 4, the water trap 122 preferably includes three inlet conduits 148, although alternative embodiments may include one or more such conduits, or other means for generating rotation of a fluid within a chamber. A duct 154 associated with one of the conduits 148 is attached below the base plate 38, such that all of the exhaust passing through the conduit must first pass through the duct, in the manner of chamber 110 shown in FIG. 3. The duct 154 contains a temperature sensor (not shown.)

The conduits 148 are positioned near the sidewall 126, so that they are almost entirely protected from above by the sidewall 126 and dam wall 140. The apertures 152 are located entirely beneath the dam wall 140 so that emissions from the apertures cannot readily exit the chamber 144 vertically. The exit apertures 152 all face in the same rotational direction. Each conduit's exit aperture 152 is positioned in a plane slightly forward of and parallel to a respective vertical plane radiating from the axis 146.

In the illustrated embodiment, the apertures face counterclockwise as viewed from above. Instead of facing radially outward from the center of the chamber, the conduits each point in a direction offset at an angle from the radial direction. Preferably, the conduits point in a direction substantially tangent to the the sidewall, such that the direction of exhaust flow passing through or exiting from the conduit is parallel to an imaginary line tangent to a portion of the sidewall near or nearest the flow. Thus, an exhaust flow 156 exiting each aperture 152 is directed obliquely against the interior surface 134. That is, the flow 156 will be deflected by the side wall by an angle of less than 90 degrees, and preferably less than 45 degrees.

Accordingly, large water droplets suspended within the exhaust flow 156 will directly impact on the interior surface 134 and adhere thereto. The sustained rotation of gas within the water trap chamber 144 will cause such droplets to progress circumferentially about the chamber, and downwardly toward the base plate 38 due to the slope of the interior surface, the centrifugal effect of such circumferential motion, and gravity. Smaller droplets remaining suspended within the exhaust flow 156 for longer periods may be carried by the vortex of rotating gas within the chamber 144 until the effect of centrifugal force draws such droplets to contact the interior surface 134. A flow of dewatered gas 158 then exits the chamber 144 through the dam plate exit aperture 142.

The exit aperture 142 is large enough to avoid creating unnecessary back pressure in the exhaust system, but is small enough to permit a sufficiently wide annulus to create an upper barrier for containing within the dewatering chamber 144 the peripheral flow of the vortex. In the alternative embodiment, the exit aperture 142 preferably is slightly more than one-half the diameter of the dam plate 140, although this dimension may be as small as one-quarter of the plate diameter where the filter 24 is highly sensitive to moisture. The dam plate 140 may be eliminated altogether in cases where exhaust moisture is not a substantial concern.

Means for draining water from the water trap chamber 144 is provided by a central drain aperture 162 and a peripheral drain aperture 164 defined in the base plate 38. An enclosed drain channel 166 is attached below the base plate 38 below the drain apertures 162, 164. The channel 166 empties into a drain conduit 168 which communicates with a drain reservoir (not shown). The peripheral drain aperture 164 primarily collects fluid collecting near the lower edge 128 of the trap sidewall 126; the central aperture 162 is positioned at or near the center of the base plate 38 to collect water that tends to pile up in the center of the plate at the low pressure region created by the inward and upward flow of the dewatered gas exiting the chamber.

The tapered exterior surface 136 of the water trap sidewall 126 provides a guide to facilitate the installation of the air filter 24. The outside diameter of the sidewall 126 at its lower edge 128 is slightly smaller than the interior diameter of the filter 24. Thus, the filter position is constrained by the sidewall, but is allowed slight lateral free play so that the filter may compress fully downward against gasket 88 to provide a seal against the base plate 38. Unlike the embodiment shown in FIG. 3, the lid 54 is attached by peripheral over center clamps (not shown), instead of by the threaded central spindle. Also, the filter illustrated in FIG. 5 has a taller aspect ratio and a larger surface area than that shown in FIG. 3. This increases filter life and reduces exhaust back pressure, although the height and filter chamber design may be varied depending on the application.

Having illustrated and described the principles of the invention by what are presently preferred embodiments, it should be apparent to those skilled in the art that the illustrated embodiments may be modified without departing from such principles. For instance, the means for generating circulation within the water trap chamber may be provided by structures other than the tangentially directed conduits 148. Orbital air flow may be generated by tangentially directed louvers formed in the base plate, or by a rotating element such as a turbine within the chamber, powered by an external source or by exhaust gas flow. Also, the sidewall 126 need not be conical with a circular cross section. A polygonal or straight-walled chamber boundary may provide the desired circulating flow.

We claim as our invention not only the illustrated embodiments, but all such modifications, variations and equivalents thereof as come within the spirit and scope of the following claims.

We claim:

1. An exhaust gas treatment system for a low profile underground mining vehicle having an upper surface, the system comprising:

a water scrubber mounted on the vehicle to reside at or below the vehicle upper surface, the scrubber having a scrubber outlet;

a water trap and filter housing having an inlet in communication with the scrubber outlet and mounted to the scrubber at a position directly thereabove, such that only the water trap and filter housing extends above the upper surface; and an exhaust gas outlet formed in the water trap and filter housing, the exhaust gas outlet having an outlet opening operable to direct exhaust gas emerging from the water trap and filter housing in a direction other than upwardly from the vehicle such that the exhaust gas avoids impingement with a ceiling of an underground mine.

2. The exhaust gas treatment system of claim 1, wherein the exhaust gas outlet further comprises an exhaust gas chamber housed within an outwardly protruding exhaust chamber portion of the water trap and filter housing.

3. The exhaust gas treatment system of claim 2, wherein an exhaust conduit extends downwardly from the protruding exhaust chamber portion of the water trap and filter housing to direct exhaust gases downwardly.

4. The exhaust gas treatment system of claim 2, wherein a mixing chamber is in fluid connection with the exhaust gas chamber, the mixing chamber permitting exhaust gas to mix with ambient air to dilute the exhaust gas.

5. The exhaust gas treatment system of claim 1, wherein the exhaust gas outlet comprises an exhaust gas outlet conduit extending horizontally from the water trap and filter housing.

6. The exhaust gas treatment system of claim 1, further comprising a horizontal baseplate positioned between the water scrubber and the water trap and filter housing, the baseplate having an outlet hole defined in a peripheral portion thereof; and a downwardly depending outlet conduit portion of the exhaust gas outlet is mounted within the outlet hole.

7. An exhaust gas treatment system for a low profile underground mining vehicle having an upper surface, the system comprising:

a water scrubber mounted on the vehicle to reside at or below the vehicle upper surface, the scrubber having a scrubber outlet;

a water trap and filter housing mounted to the scrubber at a position directly thereabove such that only the water trap and filter housing extends above the upper surface, the water trap and filter housing having a side wall, and a bottom inlet in communication with the scrubber outlet; and a filter disposed in the water trap and filter housing, the filter having upper and lower edges; and an exhaust gas outlet chamber in communication with the filter, the outlet chamber being defined within an outlet chamber housing formed in the side wall, and a downwardly-oriented exhaust outlet aperture being defined in the outlet chamber housing.

8. The exhaust gas treatment system of claim 7, the side wall has a side wall height dimension, and the outlet chamber housing has a chamber height dimension, the chamber height dimension being less than the side wall height dimension.

9. The exhaust gas treatment system of claim 7, wherein the exhaust gas outlet chamber is positioned adjacent the lower edge of the filter.

10. The exhaust gas treatment system of claim 7, wherein the upper and lower edges of the filter define a filter height dimension, and the outlet chamber has a chamber height dimension that is less than the filter height dimension.

11. The exhaust gas treatment system of claim 7, wherein the outlet chamber housing protrudes horizontally from the water trap and filter housing.

12. The exhaust gas treatment system of claim 7, wherein an exhaust gas conduit extends downwardly from the chamber housing to a mixing chamber, the mixing chamber being open to ambient air to permit exhaust gas to mix with ambient air.

13. The exhaust gas treatment system of claim 7, wherein a gap is located between the filter and the side wall, the gap permitting communication between the filter and the exhaust gas outlet chamber.

14. An exhaust gas treatment system for a low profile underground mining vehicle having an upper surface, the system comprising:

an integral water scrubber, water trap and filter device with a low-profile upper housing portion having a relatively small height dimension, a lower housing portion having a relatively large height dimension, and a downwardly-depending exhaust gas outlet operable to direct exhaust gas in a direction substantially along or below a horizontal plane, the lower housing portion residing at or below the vehicle upper surface when the integral water scrubber, water trap and filter device is mounted on the vehicle.

15. The exhaust gas treatment system of claim 9, wherein the upper housing portion and the lower housing portion are cylindrical, and the upper housing portion has a relatively greater cylindrical diameter than does the lower housing portion.

16. The exhaust gas treatment system of claim 9, wherein the exhaust gas outlet is defined in the upper housing portion.

* * * * *